United States Patent

Matsui et al.

[11] 4,189,214
[45] Feb. 19, 1980

[54] FOURIER TRANSFORM LENS SYSTEM

[75] Inventors: Yoshiya Matsui; Setsuo Minami, both of Kanagawa; Shih Yamaguchi, Hiratsuka, all of Japan

[73] Assignee: Canon Kabushiki Kaisha, Japan

[21] Appl. No.: 880,500

[22] Filed: Feb. 23, 1978

Related U.S. Application Data

[63] Continuation of Ser. No. 748,194, Dec. 7, 1976, abandoned, which is a continuation of Ser. No. 438,850, Jan. 24, 1975, abandoned.

[30] Foreign Application Priority Data

Jan. 31, 1974 [JP] Japan .................... 49-12933

[51] Int. Cl.² .................. G02B 9/60; G02B 9/62
[52] U.S. Cl. .................... 350/215; 350/217
[58] Field of Search .......... 350/215, 217, 225–229

[56] References Cited

U.S. PATENT DOCUMENTS

| | | | |
|---|---|---|---|
| 1,939,098 | 12/1933 | Berek | 350/225 |
| 3,437,398 | 4/1969 | Muller et al. | 350/225 |
| 3,601,474 | 8/1971 | Knetsch | 350/225 |

OTHER PUBLICATIONS von-Bieren, K., "Lens Design for Optical Fourier Transform Systems" Applied Optics, vol. 10, No. 12, pp. 2739-2742, Dec. 1971.

*Primary Examiner*—Conrad J. Clark
*Attorney, Agent, or Firm*—McGlew and Tuttle

[57] ABSTRACT

The present invention includes asymmetrical Fourier transform lens systems for use in performing optical Fourier transforms. The present invention also treats the application of an aberration theory to the design of such lens systems. The aberration theory leads to the conclusion that the lens systems not always necessitate symmetrical configuration and to a provision of necessary conditions which the resulting lens systems should satisfy. One embodiment of the first subsystem comprises at least three lens components each of which is composed of at least two lens elements. In a complete optical Fourier transform lens system, the second subsystem of the same construction as that of the first subsystem is arranged in longitudinally inverted relation thereto.

4 Claims, 20 Drawing Figures

LATERAL ABERRATION
(SAGITTAL PLANE mm)

FIG. 11

FOURIER TRANSFORM LENS SYSTEM

This is a continuation of application Ser. No. 748,194 filed Dec. 7, 1976 now abandoned; continuation of Ser. No. 438,850, Jan. 24; 1975, abandoned.

BACKGROUND OF THE INVENTION

This invention relates to a lens design for optical Fourier transform systems, and more particularly to a Fourier transform lens system of the configuration rotationally symmetric with respect to the optical axis thereof and in which the object plane is placed in the primary focal plane and the aperture plane in which the spectrum of the object is formed coincides with the secondary focal plane to optically realize the Fourier transform relationship while effecting good state of simultaneous correction of various aberrations accompanied with imaging of the object and formation of the spectrum.

Optical Fourier transform systems are used to obtain a spectral distribution F(x') which is generated through a diffraction of an object such as that having a transmission coefficient, f(x), or further to obtain a reconstructed image of the object which is a diffraction pattern of the said spectrum. In realizing these processes by use of an actual lens, this lens is required to produce an image of the object and an image of the pupil in good states simultaneously.

Because of fundamental relations between aberrations accompanied with imaging of the object and also imaging of the pupil, it is thought impossible, within the conventional common sense of optics, to correct aberrations of these two sort of imaging in good states simultaneously.

The object of the present invention is to provide a lens system capable of achieving Fourier transformation optically in satisfactory manner, based on a theoretical finding that correction of aberrations in the two sorts of imaging can be attained simultaneously without any contradiction.

BRIEF DESCRIPTION OF THE DRAWINGS

FIGS. 9a throught 9e are various aberration curves for the formation of spectrum in the lens system of FIG. 8 constructed in accordance with the numerical date of Table 3.

DETAILED DESCRIPTION OF THE INVENTION

Figure 1:
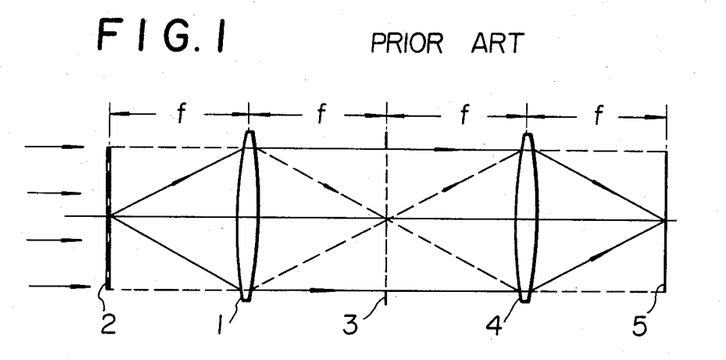
FIG. 1 is a diagram of Fourier transform geometry.

A conventional lens arrangement for realizing a Fourier transform relationship is shown in FIG. 1, wherein 1 is a first Fourier transform lens, and 4 is a second Fourier transform lens, each of these lenses 1 and 4 having an equivalent focal length f. With an object 2 having a certain transmission distribution placed in the primary focal plane of the first lens 1 and illuminated with a parallel pencil of coherent light, it is possible to obtain a spectral distribution as a result of Fourier transformation of the transmission distribution of the object 2 in an aperture 3 positioned in the secondary focal plane of the first lens 1. This spectral distribution further undergoes Fourier transformation by the second lens 4 to produce a reconstructed image of the object in the secondary focal plane of the second lens 4.

In such a lens arrangement for performing Fourier transformation, the first lens 1 may be considered to form the spectrum with coherent light diffracted at the object 2. In order that this Fourier transform relationship is rigorously realized in the lens arrangement, it is required that the m-order diffracted rays generated from the coherent light incident upon an object 20 having a grating constant, d, or collimated rays making an angle of diffraction, $\epsilon_m$, with respect to the optical axis as shown in FIG. 2a, and the m-order spectrum formed with these diffracted rays, or the point image formed at a height l'm from the optical axis must satisfy the following equation.

$$l'm = f \cdot \sin \epsilon_m \quad (1)$$

Figure 2A:
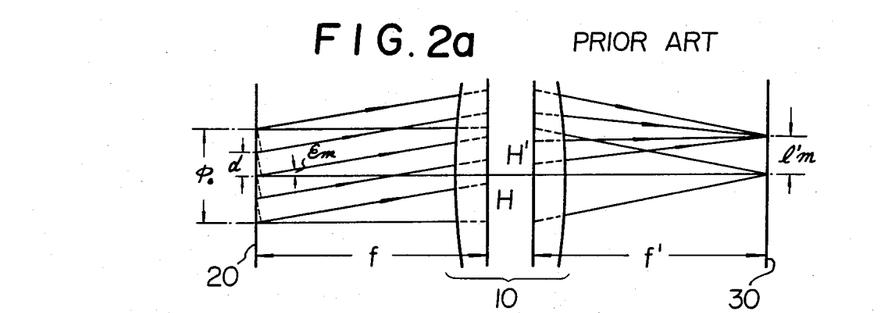
FIG. 2a is a diagram illustrating formation of the spectrum of an object caused by diffraction.

In FIG. 2a, the first Fourier transform lens is designated at 10, the primary principal point of the lens 1 at H, the secondary principal point at H', the primary focal length of the lens 1 is f, the secondary focal length is f', and the plane in which the spectrum is formed at 30.

Figure 2B:
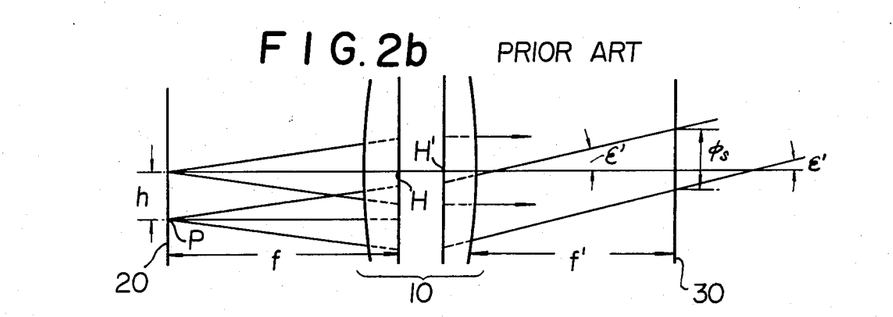
FIG. 2b is a diagram illustrating behavior of diffracted rays from a point object.

Accordingly, the expression $f \cdot \tan \epsilon_m$ as a definition of the ideal image height which has been used for ordinary optical systems (which are referred, for convenience, to the well-known lens systems such as photographic objectives and/or projection lenses) has to be changed as $f \cdot \sin \epsilon_m$ for Fourier transform systems. From the practical standpoint of lens design, the formation of spectrum may be considered to be "formation of an image of the pupil" when the entrance pupil of the lens is at infinity in the object space. On the other hand, as shown in FIG. 2b, a pencil of rays diffracted at a point P, which is on the object plane 20 and at a height h from the optical axis, after passing through the lens 10 emerge as a pencil of collimated rays making an angle $\epsilon'$ with the optical axis as far as the ideal system is concerned. In this case, the Fourier inverse transformation is realized by the following equation.

$$\sin \epsilon' = h/f \quad (2)$$

From the practical standpoint of lens design, this relation may be considered to be "formation of an image of the object" when the image is at infinity in the image space. It will be pointed out that in order to obtain optically a Fourier spectrum of the transmittance distribution of the object, attention must be paid not only to the position of the image of the spectrum, but also to the angle of rays contributing to the image forming of the object.

After all, the conditions for a Fourier transform lens to realize a rigorous Fourier transform relationship between an object of finite size and an aperture of finite opening size can be replaced as a relationship expressed in geometrical optics, whereby the necessary and sufficient conditions are such that the image of the object and the image of the pupil are perfect, or free from various aberrations. As far as the fact that the relations of ideal image formation in Fourier transform lenses must be governed by equations (1) and (2) and differ from those of image formation in ordinary optical systems has already been pointed out by K. von Bieren in his "theory of optical Fourier transforms" (APPLIED OPTICS Vol. 10, No. 12/December 1971). Bieren has proposed an asymmetrical Fourier transform lens, but this lens does not satisfy the necessary and sufficient conditions of the present invention.

The second arrangement of the second Fourier transform lens in FIG. 1 is equivalent in geometrical optics to that of the first Fourier transform lens except that the relation between the pupil and the object is inverted. As has already been stated above, the first and second lenses are identical in performance to each other as far as the ideal imaging process for formation of images of the pupil and the object is concerned. Therefore, the design for the first lens may be applied to the second lens without any modification. From this point of view, it is to be understood that the discussion for the first lens is valid for the second lens. For this reason, the following description will be given only to the first lens.

Figure 3:
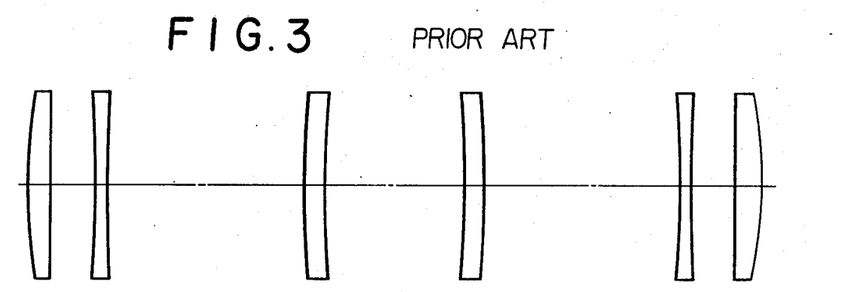
FIG. 3 is a block diagram of a typical example of a prior art Fourier transform lens system.

A typical example of the conventional Fourier transform lens usuable as the first lens of FIG. 1 is illustrated in FIG. 3. This lens is constructed in the form of perfect symmetry as a whole. The reason of employment of the perfect symmetric form may be considered to be based on the fact that the perfect symmetry of lens configuration assures automatically correction of aberrations related to image formation of the object correction of an image of the object as the aberration correction of the image of the pupil is improved. However, it is known that the symmetrical configuration is very disadvantageous as compared with the asymmetrical one in controlling the aberration correction, because the degree of freedom is considerably reduced.

Nevertheless, almost no practically usuable asymmetric Fourier transform lens has been developed. This is because the theoretical basis for producing well corrected images of both of the object and the pupil simultaneously has not be clarified from the standpoint of the aberration theory.

The present invention is based on the theoretical result developed by the application of aberration theory, that the simultaneous correction of two sort of aberrations, one of which being concerning to the image of object and the other to the image of pupil, is possible even though fundamental relations exist between there two sort of aberrations. The result makes it possible to develope optical Fourier transform systems of high performance under introduction of asymmetric configuration.

Consideration will now be given to the necessary conditions for designing Fourier transform lenses having high performance and the theoretical basis of derivation thereof. For the process of deriving such conditions, it is at first necessary to define expansion formulas for aberrations of Fourier transform lens systems under the assumption that the ideal image formation should be governed by the equations (1) and (2). The expansion formulas of aberration generally express the behaviour of a ray in the image space as power series expanded with respect to field angle and aperture radius in the object space, the basis of this expansion being ideal image formation. The 1st-order terms of the power series represent the ideal image formation, and the higher order terms are related to respective aberrations, the expansion coefficients of these higher order terms being usually called "aberration coefficients".

In deriving expansion formulas for aberrations of optical Fourier transform systems, ray heights on the object plane are convinient as parameters to represent field angle, while angular components of a ray are convenient as parameters to represent aperture size because the entrance pupil is at infinity.

Figure 4:
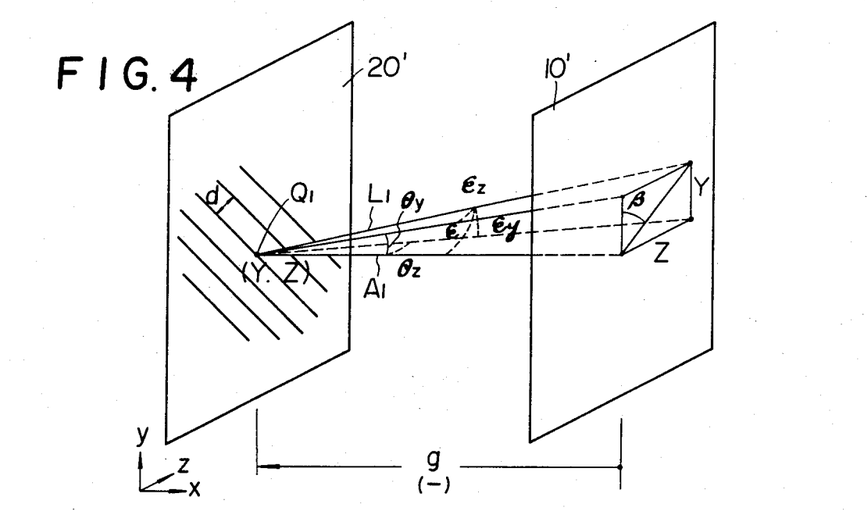
FIG. 4 is a schematic perspective view considered in explanating the determination of angular components of a ray diffracted at the object plane.
Figure 5:
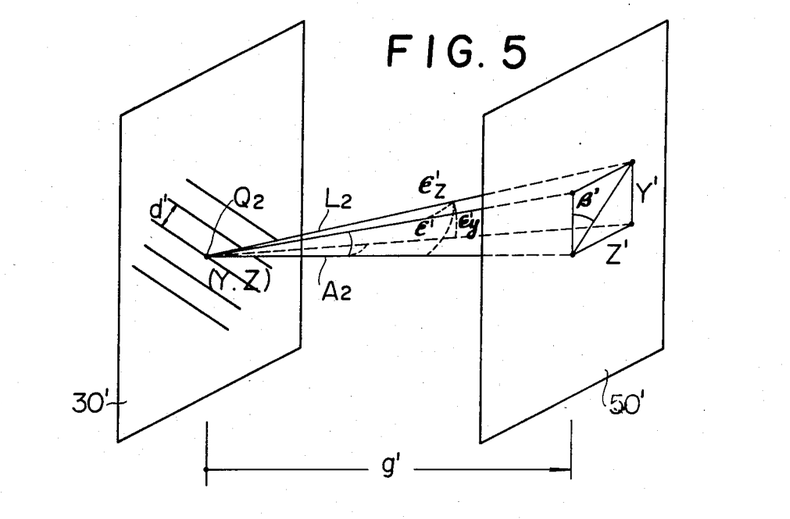
FIG. 5 is a schematic perspective view considered in explanating the determination of angular components of a ray diffracted at the aperture plane.

Referring now to FIGS. 4 and 5, these are diagrams to show geometry considered in deriving the expansion formulas, wherein the X coordinate is parallel to the optical axis, and the Y and Z coordinates are orthogonal to each other in a plane perpendicular to the optical axis. In the object space shown in FIG. 4, the coordinates on the object plane 20' are represented by (Y, Z), a line parallel to the optical axis by $A_1$, and a ray from a point $Q_1$ by $L_1$. The ray $L_1$ propagates in a direction of which the angular components are represented by ($\epsilon^*_y$, $\epsilon^*_z$) and strikes the pupil plane 10' (in this instance, at infinity) at a point of which the coordinates are represented by ($Y^*$, $Z^*$). The pupil plane is spaced apart from the object plane by a distance, g, and spacing of the periodic pattern on the object plane is represented by, d. It is to be noted that a ray in an ordinary optical system such as a photographic objective is represented by tangents of $\delta^*_y$ and $\delta^*_z$. In the image space shown in FIG. 5, the coordinates in the aperture plane 30' are represented by (Y', Z'), a line parallel to the optical axis by $A_2$, and a ray from a point $Q_2$ by $L_2$. The ray $L_2$ propagates in a direction of which the angular components are represented by ($\epsilon'_y$, $\epsilon'_z$) and strikes the image plane 50' (in this instance, at infinity) at a point of which the coordinates are represented by (Y', Z'). The image plane is spaced apart from the aperture plane by a distance, g', and spacing of the periodic pattern on the pupil plane is represented by d'.

For an optical system rotationally symmetric with respect to the optical axis, we can set $Z \equiv 0$ without loss of generality. Therefore, in the expansion formulas, (Y, Z≡0) and (sin $\epsilon_y$, sin $\epsilon_z$) are used as the expansion parameters. Formulas to represent imaging of pupil and imaging of object are expressed as 3rd order power series of these parameters. However, the nomenclature of the aberration coefficients follows to the conventional aberration theory.

(i) The formulas to represent imaging of pupil

Let (Y', Z') designate the coordinates of a point at which a ray intersects the spectrum plane (aperture plane), then Y' and Z' are given by the following equations.

$$\bar{a}'\overset{*}{Y} = \frac{1}{\alpha}(N\sin\overset{*}{\epsilon_y}) - \frac{1}{2}[F\alpha^3 Y^3 - 3IF\alpha Y^2(N\sin\overset{*}{\epsilon_y}) \quad (3)$$
$$+ \frac{1}{\alpha}Y\{(2IIF + IV^S)(N\sin\overset{*}{\epsilon_y})^2 + IV^S(N\sin\overset{*}{\epsilon_z})^2\} -$$
$$(V^S + \frac{\alpha^2}{N^2})\frac{1}{\alpha^3}(N\sin\overset{*}{\epsilon_y})\{(N\sin\overset{*}{\epsilon_y})^2 + (N\sin\overset{*}{\epsilon_z})^2\}]$$

-continued $$\bar{a}'\overset{*}{Z}' = \frac{1}{\alpha}(N\overset{*}{\sin\epsilon_z}) - \frac{1}{2}[-I^s\alpha Y^2(N\overset{*}{\sin\epsilon_z})$$
$$+ 2II^s\frac{1}{\alpha}Y(N\overset{*}{\sin\epsilon_y})(N\overset{*}{\sin\epsilon_z})$$
$$- (V^s + \frac{\alpha^2}{N^2})\frac{1}{\alpha^3}(N\overset{*}{\sin\epsilon_z})\{(N\overset{*}{\sin\epsilon_y})^2 + (N\overset{*}{\sin\epsilon_z})^2\}]$$

wherein

N is the refractive index of the medium in the object space;

$\alpha = -1/f$, f is the focal length (normalized) of the lens;

$\alpha' = -1$.

$I^s$, $II^s$, $III^s$, $IV^s$, $V^s$ are the 3rd-order aberration coefficients having the following nomenclature.

$I^s$: Spherical aberration of pupil;
$II^s$: Coma of pupil;
$III^s$: Astigmatism of pupil;
$IV^s$: Sagittal field curvature of image field of pupil;
$V^s$: Distortion of image of pupil.

(ii) The formulas to represent of object

The angular components $\sin\epsilon'_y$, and $\sin\epsilon'_z$ of an exit ray in the image space are given by the following equations.

$$N'\sin\epsilon_y' = \quad (4)$$
$$-\alpha\bar{\alpha}'Y + \frac{\bar{\alpha}'}{2}(V + \frac{\bar{\alpha}'^2}{N^2})\alpha^3Y^3 - (2III + IV)\alpha Y^2(N\overset{*}{\sin\epsilon_y})$$
$$+ II\frac{1}{\alpha}Y\{3(N\overset{*}{\sin\epsilon_y})^2 + (N\overset{*}{\sin\epsilon_z})^2\}$$
$$- I\frac{1}{\alpha^3}(N\overset{*}{\sin\epsilon_y})\{(N\overset{*}{\sin\epsilon_y})^2 + (N\overset{*}{\sin\epsilon_z})^2\}]$$

$$N'\sin\epsilon_z' = \frac{\bar{\alpha}'}{2}[-IV\alpha Y^2(N\overset{*}{\sin\epsilon_z}) + 2II\frac{1}{\alpha}Y(N\overset{*}{\sin\epsilon_y})(N\overset{*}{\sin\epsilon_z})$$
$$- I\frac{1}{\alpha^3}(N\overset{*}{\sin\epsilon_z})\{(N\overset{*}{\sin\epsilon_y})^2 + (N\overset{*}{\sin\epsilon_z})^2\}]$$

wherein $N'$ is the refractive index of the medium in the image space;

I, II, III, IV, and V are 3rd-order aberration coefficients having the following nomenclature I: Spherical aberration
II: Coma
III: Astigmatism
IV: Sagittal field curvature
V: Distortion All of the aberration coefficients are uniquely determined when the design parameters of the lens system, the object position, the aperture position and the wavelength of light employed are given, so that the behavior of a ray in the image space can be determined by the application of equations (3) and (4) under the 3rd order approximation.

The Fourier transform operation is ideally performed only when all of the terms following the second terms in the right hand side of each of equations (3) and (4), that is, all of the terms in the brackets are zero. It follows that all of the coefficients of these terms must be zero for any values of Y, $\sin\overset{*}{\epsilon_y}$ and $\sin\overset{*}{\epsilon_z}$. Hence, we get the following conditions (5) and (6) to be satisfied From equation (3)

$$I^s = II^s = III^s = IV^s = 0, \quad V^s(+\alpha^2/N^2) = 0 \quad (5)$$

From equation (4)

$$I = II = III = IV = 0, \quad V + \frac{(\bar{\alpha}')^2}{(N')^2} = 0 \quad (6)$$

wherein equations (5) provide conditions for ideal image formation of pupil and equations (6) provide conditions for ideal image formation of object.

According to the conventional aberration theory, it is well-known that $V^s$ and II, $III^s$ and III, $IV^s$ and IV, and $II^s$ and V are correlated through paraxial values to each other. These correlations are set forth below.

$$V^s - II = (\alpha'^2/N'^2) - (\alpha^2/N^2)$$
$$III^s - III = IV^s - IV = (\alpha'\bar{\alpha}'/N'^2) - (\alpha\bar{\alpha}/N^2) \quad (7)$$
$$II^s - V = (\bar{\alpha}'^2/N'^2) - (\bar{\alpha}^2/N^2)$$

wherein $\alpha$ and $\alpha'$ are the reduced inclination angles of a paraxial object ray in the object and image spaces respectively; and $\bar{\alpha}$ and $\bar{\alpha}'$ are the inclination angles of a paraxial pupil ray corresponding to $\alpha$ and $\alpha'$ respectively.

Assuming that the object and image spaces having the unit index of refraction, or $N = N' = 1$, and the focal length is normalized as $f = 1$, we obtain $$\alpha = 1, \alpha' = 0; \bar{\alpha} = 0, \bar{\alpha}' = -1 \quad (8)$$

The correlations of (7) indicate that the ten coefficients cannot be determined independently of one another; and therefore generally speaking, it is not possible to expect ideal image formation for two sort of imaging, that is, imaging of pupil and imaging of object. This situation is valid for ordinary optical systems such as photographic objectives.

On the other hand, in the case of optical Fourier transform systems conditions defined by equations (5) and (6) can be satisfied without contradiction therebetween. This can be explained as follows.

Assuming that equations (6) are satisfied and substituting the values of equations (8) into equations (7), we have $$II^s = III^s = IV^s = 0, \quad V^s + 1 = 0$$

These conditions are identical to those of equations (5) except for $I^s$. $I^s$ is not included in equations (7), so that $I^s$ may be determined independently of the others, namely, can be set as $I^s = 0$. It is to be understood from the above discussion that the conditions for ideal image formation of optical Fourier transform systems within the scope of the 3rd order aberration theory are $$I = II = III = IV = I^s = 0, \quad V = -1 \quad (9)$$

Instead of using I, II, IV, and V, it is possible to use $II^s$, $III^s$, $IV^s$ and $V^s$ as being replaced in accordance with the equations (7). These six equations (9) determine target values within the range of 3rd order aberration theory. However, in the practice of lens design, balancing against higher order aberrations must be taken into account. Results of various experiments indicate that acceptable performance can be expected to the resulting Fourier transform lens systems provided that at least the following conditions are satisfied.

$$|I| \leq 0.6, \quad |II| \leq 0.2, \quad |III| \leq 0.2$$

$$|IV| \leq 0.3, |V+1| \leq 0.2, |I^s| \leq 0.6 \quad (10)$$

These six conditions (10) do not require that the lens system be constructed in the form of symmetry. Therefore, it is preferred to employ asymmetric configuration which provides a larger number of degrees of freedom as compared with the symmetrical case. Further, the conditions (10) are applicable to the design for the second Fourier transform lens of FIG. 1, except that the relation between the object and pupil is inverted.

Next, the preferred embodiment of Fourier transform lens systems according to the present invention will be described in detail. According to the abberation theory, a lens component composed of lens elements adjacent each other has two degrees of freedom for aberration control when shapes of refracting surfaces of the lens elements are changed. And it is also pointed out that the lens component must be composed of at least two lens elements. Furthermore, in order to satisfy equations (10), the resulting whole lens system must include at least three lens components, each of which is composed of two or more lens elements. In addition, the axial separations between every lens component must be larger than any of axial separations among lens elements.

Among the equations (10), the aberration coefficients I and $I^s$ are concerned with axial aberrations. The simultaneous satisfaction of these two conditions requires the following consideration. As is well-known, I or $I^s$ of the complete optical system are given as the sum of I's or $I^s$'s of components constituting the complete optical system. Let Ii and $I^s$i designate I and $I^s$ of the i-th lens components respectively, then Ii and $I^s$i are directly proportional to about the fourth power of incident height hi of the paraxial object ray and incident height $\overline{h}i$ of the paraxial pupil ray respectively, or $$I_i \propto h_i^4 \quad I^s_i \propto \overline{h}_i^4$$

The conditions for independent control of the aberration coefficients I and $I^s$ can be determined by taking into account this fact as follows.

Figure 6:
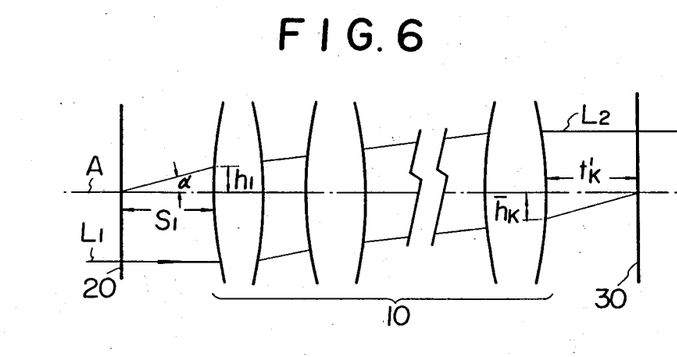
FIG. 6 is a diagram of Fourier transform geometry to illustrate the behavior of the object and pupil rays.

As is shown in FIG. 6, a Fourier transform lens system is thought to be composed of k lens components 1 through k. The length from the first lens component 1 to the object plane 20 (in this case, this is a negative value) is designated by $S_1$ and the length from the last lens component k to the aperture plane 30 is designated by $t_k'$. The optical axis is indicated at A. From the analogous relation, $h_1$ is directly proportional to $S_1$, and $h_k$ is directly proportional to $t_k'$, so that $$I_1 \propto S_1^4, \quad I_k^s \propto t_k'^4$$

This means that as $S_1$ and $t_k'$ approach zero, $I_1$ and $I^s_k$ also approach zero without limits.

On the other hand, the values of $I_1^s$ and $I_k$ are constant for any values of $S_1$ or $t_k'$. Therefore, in constructing the lens system, if the first lens component is positioned as close as possible to the object plane, while the last lens component is positioned as close as possible to the aperture plane, then $I^s$ can be controlled by the first lens component and I can be controlled by the last lens component independently each other. The result of various experiments indicates that in order to simultaneously satisfy the conditions relating to I and $I^s$, it is preferred to adjst the position of the first and last lens components within the ranges set forth below $$-0.5 \leq S_1 < 0, \quad 0 < t_k' \leq 0.5 \quad (11)$$

Figure 7:
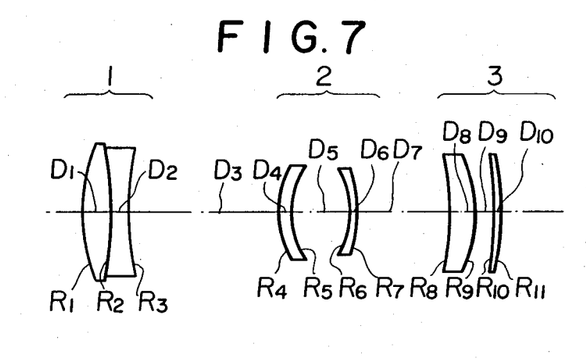
FIG. 7 is a cross sectional view of a specific example of one embodiment of a Fourier transform lens system according to the present invention.

FIG. 7, shows a specific example of a preferred embodiment of a Fourier transform lens system constructed in accordance with the present invention as comprising three lens components of positive, negative and positive powers successively arranged on a common axis, each of the lens components being composed of two lens elements. This construction is effective for shortening of the overall length of the completed lens system. The lens system of FIG. 7 can be constructed as represented by the numerical values in Table 1 below for the radii, $R_1$ to $R_{11}$, the lens thicknesses and axial separations, $D_1$ to $D_{10}$, along with the corresponding indices Ni of refraction for the spectral d line of sodium.

Table 1 f = 250mm
Object plane size = 50mm$\phi$
Wavelength of the used light : near spectral d line of sodium

| No. | Ri | Di | Ni |
|---|---|---|---|
| 1 | 67.02575 | 13.06824 | |
| | | | 1.64126 |
| 2 | −143.39065 | 8.57622 | |
| | | | 1.75106 |
| 3 | 175.19940 | 62.26196 | |
| 4 | 37.70860 | 5.42395 | |
| | | | 1.49799 |
| 5 | 31.05629 | 27.63379 | |
| 6 | −31.68006 | 2.24995 | |
| | | | 1.53889 |
| 7 | −61.11344 | 39.89184 | |
| 8 | −107.10047 | 10.25952 | |
| | | | 1.78177 |
| 9 | −64.59962 | 7.24256 | |
| 10 | −207.07091 | 3.17446 | |
| | | | 1.77564 |
| 11 | −110.18753 | | |

Table 2

| Aberration coefficient (f = 1) | |
|---|---|
| I = 0.43141 | $I^s$ = 0.46530 |
| II = −0.06482 | $II^s$ = −0.06174 ( = V + 1) |
| III = −0.00843 | $III^s$ = −0.00843 ( = III) |
| IV = 0.10475 | $IV^s$ = 0.10475 ( = IV) |
| V = −1.06174 | $V^s$ = −1.06482 ( = II − 1) |

Figure 8:
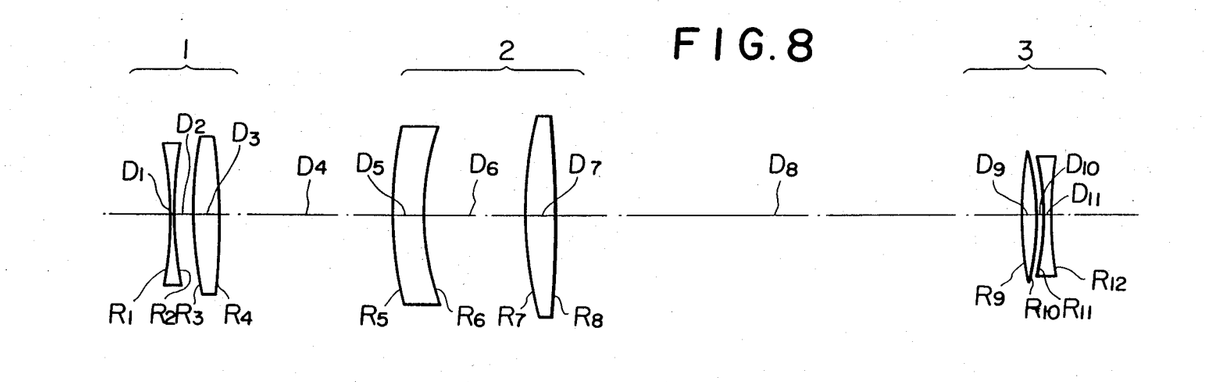
FIG. 8 is a cross sectional view of another example of the embodiment of the present invention.
Figures 9A, 9B, 9C:
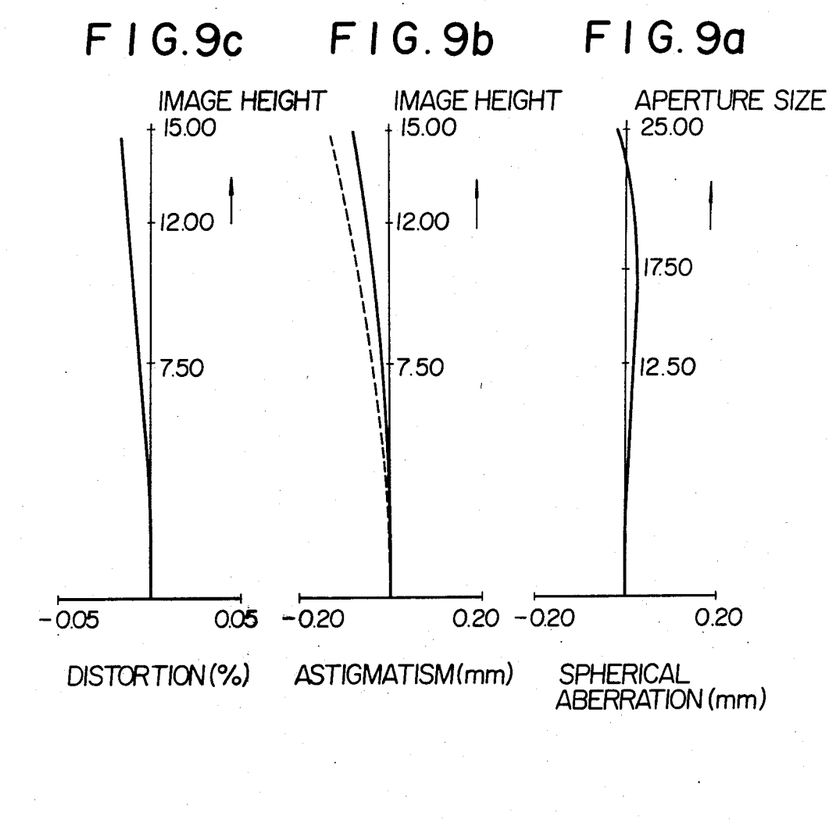
Figure 9D:
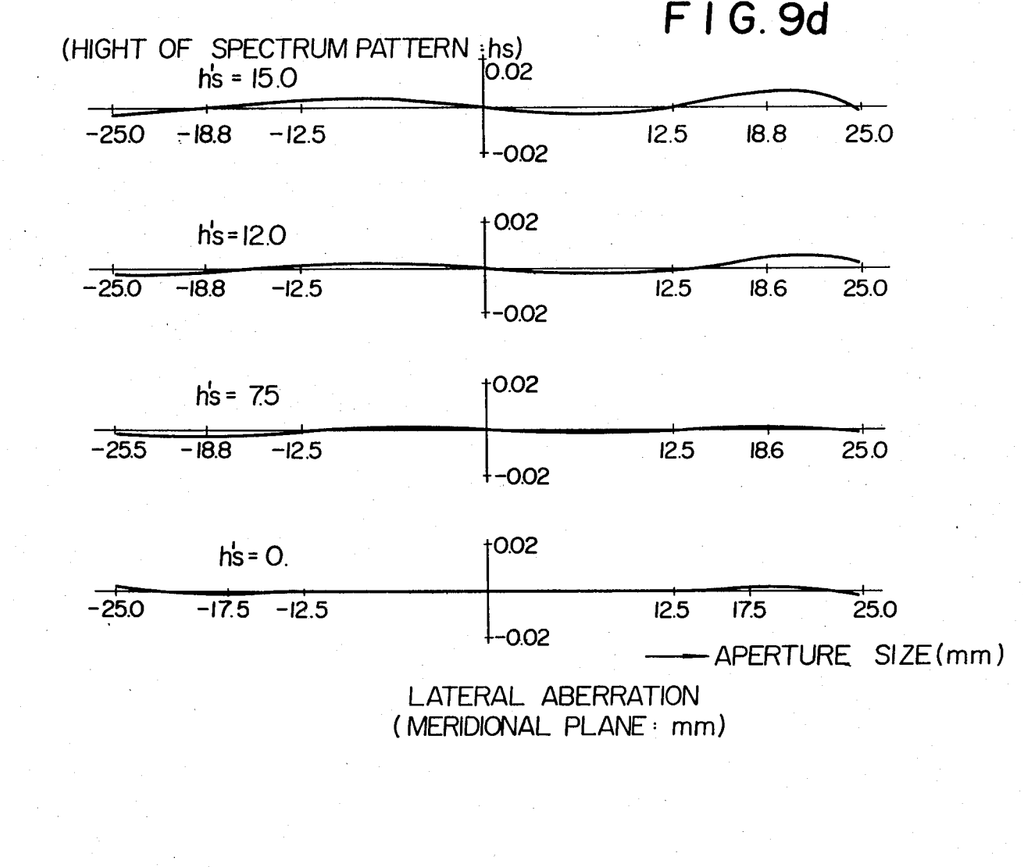
Figure 9E:
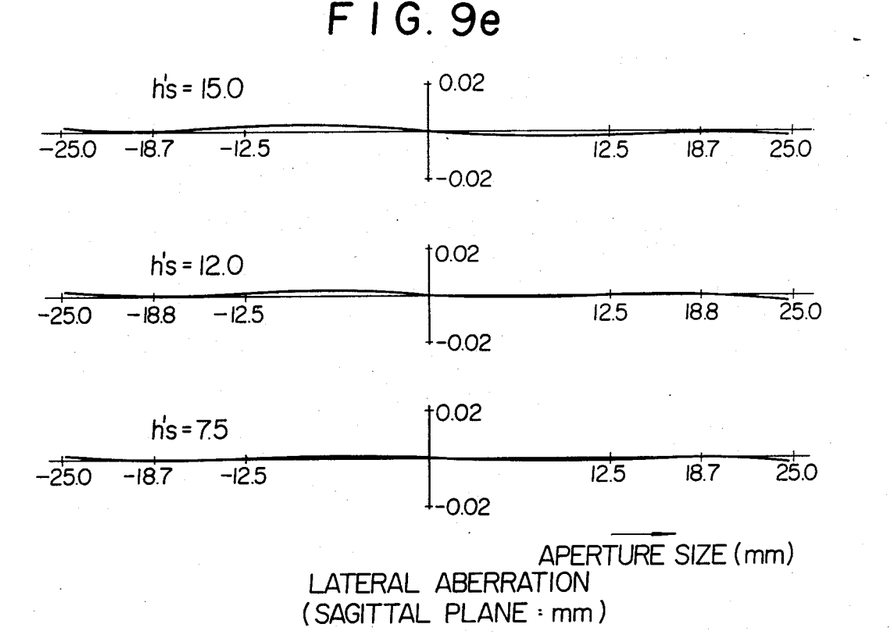
Figure 10A:
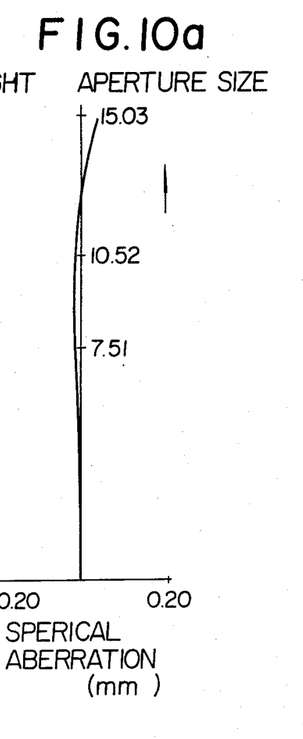
FIGS. 10a through 10e are various aberration curves of a reconstructed image.
Figures 10B, 10C:
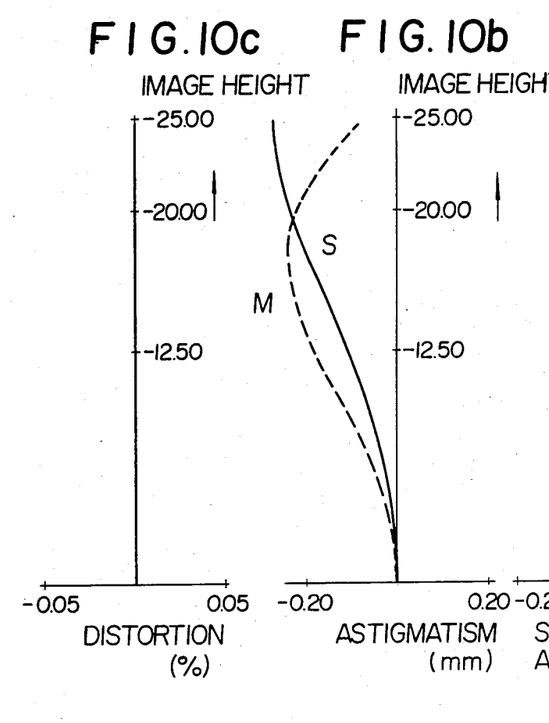
Figure 10D:
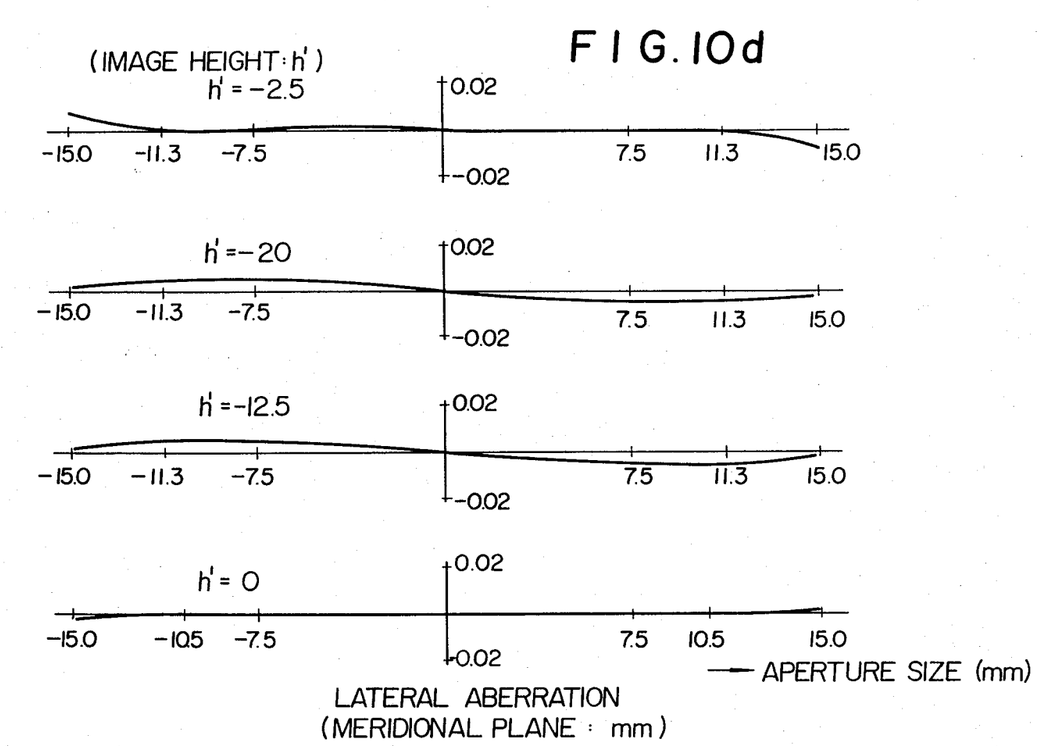
Figure 10E:
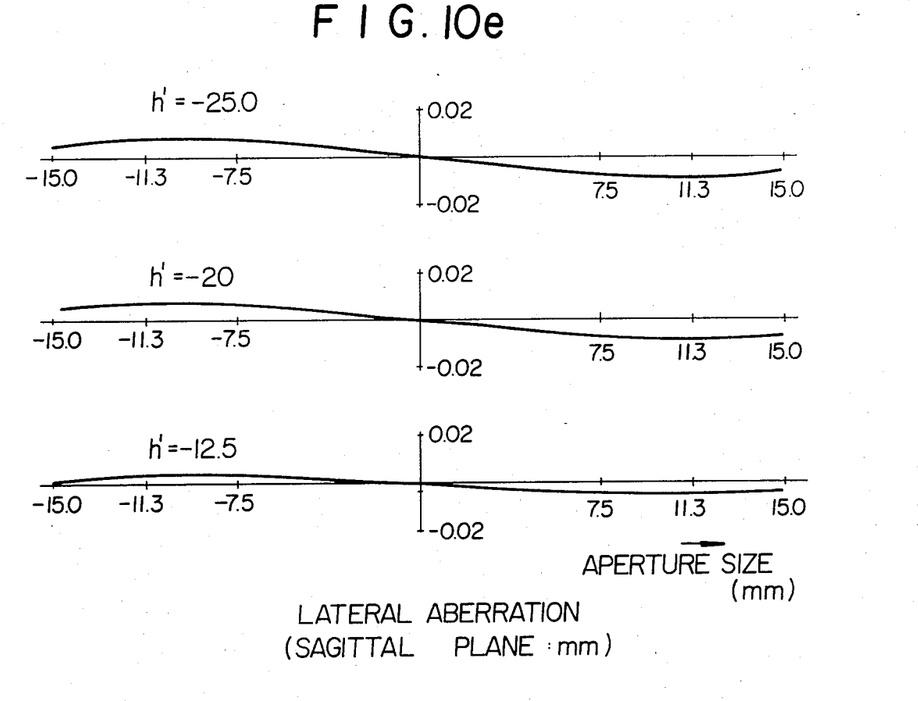

FIG. 8, shows another specific example of the embodiment of the present invention. The lens system of FIG. 8 is constructed as comprising three lens components of negative, positive and positive powers successively arranged on a common optical axis, and as represented by the numerical data in Table 3 below. FIGS. 9a through 9e are graphic representations of various aberrations of spectral image in the lens system according to the numerical data of Table 3, and FIGS. 10a through 10e are graphic representations of various aberrations of reconstructed image in the same lens system.

Table 3

| No. | Ri | Di | Ni |
|---|---|---|---|
| 1 | −160.54176 | 0.96856 | |
| | | | 1.53545 |
| 2 | 116.88481 | 7.87350 | |
| 3 | 127.87331 | 11.40028 | |
| | | | 1.78927 |
| 4 | −706.53355 | 73.83183 | |
| 5 | 140.14704 | 13.02134 | 1.56475 |
| 6 | 93.15769 | 44.80414 | |

Table 3-continued

| No. | Ri | Di | Ni |
|---|---|---|---|
| 7 | 193.41861 | 12.56768 | 1.75723 |
| 8 | −766.68307 | 99.86001 | |
| 9 | 350.69226 | 5.80774 | 1.78071 |
| 10 | −95.37242 | 3.18966 | |
| 11 | −85.90727 | 2.88270 | 1.69312 |
| 12 | 396.85665 | | |

Table 4

| Aberration coefficient | |
|---|---|
| I = 0.08524 | $I^s$ = −0.05528 |
| II = −0.13405 | $II^s$ = −0.07592 (= V + 1) |
| III = 0.09836 | $III^s$ = 0.09836 (= III) |
| IV = 0.21325 | $IV^s$ = 0.21325 (= IV) |
| V = −1.07592 | $V^s$ = −1.13405 (= II − 1) |

Size of circle of confusion (Spectrum plane) : below 0.02mm
\*Size of circle of confusion (Reconstructed image plane) : below 0.02mm
\*\*Distortion of the spectrum : below 0.02%
\*\*Distortion of the reconstructed image : 0%
Note:
\*The arrangement corresponding to FIG. 1 is employed in which the first and second lenses are symmetric to the aperture plane.
\*\*The ideal image hight is defined by equations (1) and (2).

The tolerable values determined by only the numerical select data in Tables 2 and 4 are as follows.

$$0 < I < 0.5,\ -0.15 < II < -0.5,\ -0.02 < IIII < 0.12,$$
$$0.085 < IV < 0.23,\ -0.09 < V+1 < -0.04,$$
$$-0.07 < I^s < 0.5$$

The reason why the target values of conditions (10) are represented in the form of absolute values is based on the symmetry of balancing the aberrations. Likewise, the ranges of conditions (2) are $-0.3 < S_1 < 0$, and $0.3 < t_k' < 0.45$.

Both of the lens systems of FIGS. 7 and 8 are of asymmetric type, and each of the lens systems comprises three lens components (k=3) each of which is composed of two lens elements. The values $S_1$ and $t_k'$ in terms of f=1 are as follows.

| | | |
|---|---|---|
| Table 1 | $S_1$ = −0.140, | $t_3'$ = 0.354 |
| Table 3 | $S_1$ = −0.245, | $t_3'$ = 0.392 |

Figure 11:
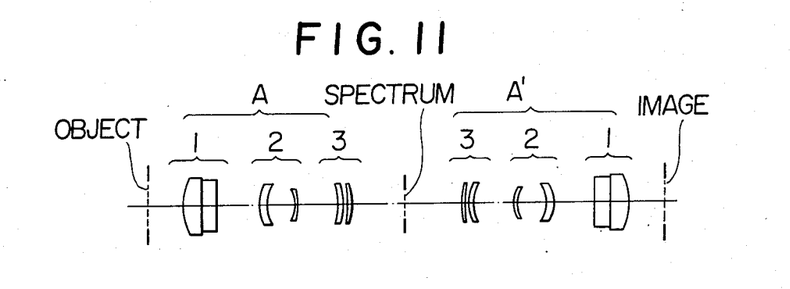
FIG. 11 is a diagram showing a Fourier transform lens system composed of two identical subsystems.

FIG. 11, shows a complete arrangement composed of two identical Fourier transform lens systems A and A'. A' is the same as A, but placed symmetrically to it with respect to the spectrum plane.

What is claimed is:

1. A Fourier transform lens system, comprising three lens groups arranged on a common optical axis and spaced apart from each other, said lens groups each including at least two respective lenses and a complete lens system having an asymmetric configuration, the axial distance between lens groups being greater than the largest axial distance between lenses within each lens group, the lens system satisfying a plurality of third order aberration coefficients for an equivalent lens system of unit focal length satisfying the following conditions:

$$|I| \leq 0.6,\ |II| \leq 0.2,\ |III| \leq 0.2,\ |IV| \leq 0.3$$
$$|V+1| \leq 0.2,\ \text{and}\ |I^s| \leq 0.6$$

wherein for the lens system; I is the coefficient of spherical aberration, II is the coefficient of coma, III is the coefficient of astigmatism, IV is the coefficient of sagittal field curvature, V is the coefficient of distortion, and $I^s$ is the coefficient of spherical aberration of pupil; an object being placed in the primary focal plane of the complete lens system producing a spectrum of the object in the secondary focal plane, an axial spacing $S_1$ of the primary focal plane of the complete lens system from the front surface of the lens adjacent the primary focal plane satisfying $-0.5 \leq S_1 < 0$, while the spacing $t_k'$ of the secondary focal plane of the complete lens system from the secondary surface of the lens adjacent the rear focal plane satisfying $0 < t_k' \leq 0.5$, wherein the focal length of the complete lens system is normalized as a unit; said axial spacing $S_1$ is represented by a negative value; and the spectrum of an object placed at the focal plane of the complete lens system is formed in the other focal plane.

2. A Fourier transform lens system, having an asymmetric configuration, comprising a first lens group and a second lens group, with the optical axis of the first lens group coinciding with that of the second lens group and a secondary focal plane of the first lens group coinciding with a primary focal plane of the second lens group, and wherein an object is provided at the primary focal plane of the first lens group and an aperture means is provided at the secondary focal plane of the first lens group; the first lens group consisting of three lens sub-groups, each one of which has at least two component lenses, having an asymmetric configuration, and the distance between the sub-groups being larger than the largest distance between the component lenses within a sub-group, and the second lens group consisting of three lens sub-groups each one of which has at least two component lenses, and the distance between the sub-groups of the second lens group being larger than the largest distance between the component lenses within a sub-group of the second lens group whereby an image of an object is formed on the secondary focal plane of the second lens group, while a spectrum of an object is formed on the primary focal plane of the second lens group, said first lens group and said second lens group being symmetrical relative to the primary focal plane of the second lens group, the axial spacing $S_1$ of the primary focal plane of the first lens group from the front surface of the lens in the first lens group adjacent the primary focal plane of the first lens group satisfying $-0.5 \leq S_1 < 0$, while the axial spacing $t_k'$ of the primary focal plane of the second lens group from the rear surface of the lens in the first lens group adjacent the primary focal plane of the second lens group satisfies $0 < t_k' \leq 0.5$, wherein the focal length of said first and second lens groups respectively are normalized as a unit, and said axial spacing $S_1$ is represented by a negative value, the first and second lens groups respectively satisfying a plurality of third order aberration coefficients for an equivalent lens system of unit focal length satisfying the following conditions:

$$|I| \leq 0.6,\ |II| \leq 0.2,\ |III| \leq 0.2,\ |IV| \leq 0.3$$
$$|V+1| \leq 0.2,\ \text{and}\ |I^s| \leq 0.6$$

wherein for each of the lens groups; I is the characteristic coefficient of spherical aberration, II is the coefficient of coma, III is the coefficient of astigmatism, IV is the coefficient of sagittal field curvature, V is the coefficient of distortion, and $I^s$ is the coefficient of spherical aberration of pupil; an object being placed in the primary focal plane of the complete first lens group producing a spectrum of the object in the secondary focal plane.

3. A Fourier transform lens system comprising at least three lens components arranged on a common optical axis spaced apart from each other, each of said lens components having at least two lens elements and the complete lens system having an assymetric configuration; whereby the spectrum of an object placed in the primary focal plane of the complete lens system is formed in the secondary focal plane thereof; the complete lens system simultaneously producing good images of the object and of the pupil; said lens system comprising three lens components arranged on said common optical axis in axially spaced relation with each lens component comprising two lens elements; the lens component nearest the object plane having a positive power and the two lens elements thereof having mating surfaces in juxtaposition; the intermediate lens component having a negative power with its lens elements being axially spaced from each other, and the lens component nearest the secondary focal plane having a positive power and its two lens elements being axially spaced from each other; said lens system having, considered in numerical order from the object plane to the secondary focal plane for a focal length of f=250 mm, an object plane size of 50 mm diameter, and using light having a wavelength near the spectral d line of sodium, the following values for the radii Ri, the lens thicknesses and axial spacings Di, and the indices of refraction Ni:

| No. | Ri | Di | Ni |
|---|---|---|---|
| 1 | 67.02575 | 13.06824 | |
| 2 | −143.39065 | 8.57622 | 1.64126 |
| 3 | 175.19940 | 62.26196 | 1.75106 |
| 4 | 37.70860 | 5.42395 | |
| 5 | 31.05629 | 27.63379 | 1.49799 |
| 6 | −31.68006 | 2.24995 | 1.53889 |
| 7 | −61.11344 | 39.89184 | |
| 8 | −107.10047 | 10.25952 | |
| 9 | 064.59962 | 7.24256 | 1.78177 |
| 10 | −207.07091 | 3.17446 | |

-continued

| No. | Ri | Di | Ni |
|---|---|---|---|
| 11 | −110.18753 | | 1.77564 |

4. A Fourier transform lens system comprising at least three lens components arranged on a common optical axis spaced apart from each other, each of said lens components having at least two lens elements and the complete lens system having an asymmetric configuration; whereby the spectrum of an object placed in the primary focal plane of the complete lens system is formed in the secondary focal plane thereof; the complete lens system simultaneously producing good images of the object and of the pupil; said lens system comprising three lens components each having two lens elements and arranged on a common optical axis; the lens components nearest the object plane having a negative power, the intermediate lens component having a positive power; and the lens component nearest the secondary focal plane having a positive power; said lens system, for a focal length of f=250 mm, an object plane size of 50 mm in diameter, and using light having a wavelength near the spectral d line of sodium, and considered in numerical order from the object plane toward the secondary focal plane, the following values for the radii Ri, the lens thicknesses and axial spacings Di, and the indices of refraction Ni:

| No. | Ri | Di | Ni |
|---|---|---|---|
| 1 | −160.54176 | 0.96856 | |
| 2 | 116.88481 | 7.87350 | 1.53545 |
| 3 | 127.87331 | 11.40028 | |
| 4 | −706.53355 | 73.83183 | 1.78927 |
| 5 | 140.14704 | 13,02134 | 1.56475 |
| 6 | 93.15769 | 44.80414 | |
| 7 | 193.41861 | 12.56768 | 1.75723 |
| 8 | −766.68307 | 99.86001 | |
| 9 | 350.69226 | 5.80774 | 1.78071 |
| 10 | −95.37242 | 3.18966 | |
| 11 | −85.90727 | 2.88270 | 1.69312 |
| 12 | 396.85665 | | |

* * * * *

UNITED STATES PATENT AND TRADEMARK OFFICE
CERTIFICATE OF CORRECTION

PATENT NO. : 4,189,214
DATED : Feb. 19, 1980
INVENTOR(S) : Yoshiya Matsui et al.

It is certified that error appears in the above—identified patent and that said Letters Patent is hereby corrected as shown below:

On the title page in item [63], "Ser. No. 438,850" should read -- Ser. No. 543,885 --.

Signed and Sealed this

Fourth Day of November 1980

[SEAL]

Attest:

SIDNEY A. DIAMOND

Attesting Officer   Commissioner of Patents and Trademarks